United States Patent [19]

Muller

[11] Patent Number: 5,788,997
[45] Date of Patent: Aug. 4, 1998

[54] STRESS-FREE MULTIROLLER DOUGH SHEETING SYSTEM

[75] Inventor: Bernardus Wilhelmus Muller, Loveland, Ohio

[73] Assignee: Interko, Inc., Blythewood, S.C.

[21] Appl. No.: 645,956

[22] Filed: May 10, 1996

Related U.S. Application Data

[63] Continuation-in-part of Ser. No. 491,117, Jun. 16, 1995.
[51] Int. Cl.⁶ .................. A21C 3/10; A21C 9/08; A21C 11/10
[52] U.S. Cl. .................. 425/145; 425/141; 425/194; 425/239; 425/363; 425/373
[58] Field of Search .................. 425/142, 145, 425/363, 239, 241, 194, 141, 371, 372, 373

[56] References Cited

U.S. PATENT DOCUMENTS

| | | | |
|---|---|---|---|
| 5,110,277 | 5/1992 | Hayashi | 425/141 |
| 5,198,242 | 3/1993 | Groeblacher | 425/194 |
| 5,227,174 | 7/1993 | König | 425/197 |
| 5,284,670 | 2/1994 | Hayashi | 426/502 |
| 5,427,515 | 6/1995 | Muller et al. | 425/96 |
| 5,494,428 | 2/1996 | Piller | 425/145 |
| 5,505,970 | 4/1996 | Morikawa | 426/231 |
| 5,507,223 | 4/1996 | Vallius | 425/194 |

*Primary Examiner*—Jay H. Woo
*Assistant Examiner*—Iurie A. Schwartz
*Attorney, Agent, or Firm*—Handal & Morofsky

[57] ABSTRACT

A dough sheeting system comprising a cutter assembly for pulling and cutting elongated chunks of dough from a hopper containing dough is disclosed. A receiving surface is disposed beneath the cutter assembly. A motor advances the receiving surface in a direction of dough feed. A calendar assembly for receives dough output by the receiving surface and outputs a sheet of dough. A level sensor for monitoring the height of accumulated dough at the input of the calendar assembly and for producing a signal when the input exceeds a predetermined level. The motor is responsive to the signal from the level sensor to stop advancing the receiving surface when the level exceeds the predetermined level and is responsive to the signal when the height is reduced. A movement sensor monitoring the advancement of the receiving surface to actuate the cutter assembly to pull and cut a chunk of dough when the surface has advanced a predetermined distance from the position at which the surface was positioned when a prior chunk of dough was delivered to the surface. A pulling assembly is disposed under the cutter assembly and is responsive to the operation of the cutter assembly to pull chunks of dough from the cutter assembly.

22 Claims, 8 Drawing Sheets

STRESS-FREE MULTIROLLER DOUGH SHEETING SYSTEM

CROSS REFERENCE TO RELATED APPLICATION

This application is a continuation-in-part of application Ser. No. 08/491,117, filed Jun. 16, 1995 and entitled "STRESS FREE DOUGH SHEETING SYSTEM".

TECHNICAL FIELD

The present invention relates to dough sheeting system of the type which works a volume of dough by contact with facing calendar surface, particularly in the context of dough sheet formation typically in the automated manufacture of baked goods, such as pizzas, croissants, pies and the like.

BACKGROUND

Unlike cakes, cookies and other baked goods of the type which rely upon chemical-based rising agents, yeast breads and pie crusts have relatively demanding dough or batter working or kneading requirements. This is because, in the case of yeast-based products, the biological release of the gas which causes the dough or batter to rise does not occur over a relatively short period of time, as in the case of batters containing sodium bicarbonate, but rather occurs over extended periods of time ranging as long as several hours (in the case of baker's yeast infused doughs) to several days (in the case of so-called salt breads, which have no added yeast in their recipes, but rather rely on the incorporation of yeast from the environment into the dough).

Rather than relying upon the quick release of gases, yeast breads, which typically have dough recipes consisting of flour, water, salt and baker's yeast, rely upon repeated mechanical deformation for the development within the dough of an elastic gluten matrix. The two basic building blocks of the gluten, namely, glutenin and gliadin are naturally and separately occurring materials in wheat. Such mechanical deformation typically takes the form of a pushing and pulling kneading action. When water is added, for example, to wheat flour, and the mixture is kneaded, these two components are forced out of the grains of flour. Thus, released, the glutenin and gliadin link in the presence of the water. The linked components form molecular chains of relatively long length. These molecular chains form a matrix of substantially randomly oriented gluten strands, within which remaining components of the wheat are trapped resulting in an elastic mass.

Classically, the gluten matrix is developed by mixing the water, flour, salt and yeast together to form a batter or dough which is then kneaded by hand. The working of the dough with the hands causes the formation of gluten. The more that the flour is worked, the more gluten is released.

However, after the proper amount of kneading, dependent upon the dough (with more working required in the case of doughs having generally higher water content), substantially all the usefully releasable gluten will have been developed and released into the dough. In this condition, the matrix is sufficiently developed that the dough mass will recover its shape when pressed or will elastically return, to a limited extent, to its original shape when pinched and pulled. After the proper amount of kneading has been performed on the dough, any hoped for improvement in the quality of the dough that will be provided by any additional gluten, released by further kneading the dough, will be insubstantial, while substantial damage to the gluten chains will start occurring. This results in a net decrease in dough quality. This condition is often referred to as "overkneading". Generally, the rheology of the dough is such that, during overkneading, damaging stresses are applied to an already sufficiently formed gluten matrix and the elasticity of the dough is damaged.

However, this elastic condition of the dough is exactly what allows the dough to rise prior to baking. In particular, as the yeast multiplies in the presence of water and salt, the yeast microorganisms release carbon dioxide into the elastic dough and gluten matrix. This carbon dioxide tends to form tiny bubbles which expand and stretch the gluten matrix beyond the breaking point causing the tiniest bubbles to merge into other small bubbles which thus become progressively larger as merging occurs, thus forming numerous and larger bubbles. Thus, damage to the gluten matrix prior to rising must be avoided. Failure to preserve the quality of the gluten matrix will result in such defects as uneven or incomplete rising of the dough.

Conversely, overkneading, whether by pressure or by pulling will both result in stretching out the molecular strains into relatively straight chains. Under further stress the chains will be pulled past the breaking point, thus damaging the overall elasticity of the gluten and its ability to incorporate a great number of relatively small air chambers for containing the entrapped carbon dioxide produced by the yeast. In the most extreme case, almost all of the elasticity of the dough will be destroyed and the ability of the dough to rise will be severely compromised. The end result may be a bread of relatively dense character for the particular flour components in the recipe, or a bread incorporating large voids in some parts of its architecture and relatively small voids in other parts. This may result in part of the dough having a dough-like characteristic on account of resultant unevenness in the cooking of the bread. Such unevenness in cooking is to a large extent a direct result of the non-uniformity in the architecture of the raised unbaked dough.

Thus, overkneading or other forms of overworking of dough after sufficient gluten has been released is to be avoided. The result of such overworking goes beyond the mere aesthetics or the uniformity of the cooked product. A poor rise in the dough may make it necessary to use a greater amount of flour in order to manufacture the desired product. This means correspondingly greater costs. Thus, even in situations, such as pizza manufacture, where relatively broad ranges in the quality of the risen dough may be tolerated from the standpoint of acceptable product to the consumer, e.g. dense through light "bready" crusts on through "crispy" crusts, there are still strong economic reasons for achieving a good rise in the unbaked dough.

One way of addressing this problem is to let the dough rest for a time between successive workings. During the resting period, substantial repair of the gluten structure can occur. The use of a kneading step, followed by a first rise, followed by a second kneading and a final rise type process will also result in a repair of the dough's gluten matrix where the same has been damaged by overkneading. However, such repair processes are not complete and add costs. Moreover, where knead and rise processes are properly done, the products are substantially the same as those made in double rise processes.

The other approach for obtaining a dough with good elasticity is to carefully design the dough working process to ensure that the dough is not overworked during kneading or subsequent dough forming steps such as calendaring into sheets, sheet reduction, lamination of dough layers (done, for example, in croissant manufacture), or the like.

One of the general solutions to preservation of the integrity of the gluten matrix is to have repeated gentle and relatively small working steps, separated by periods during which the dough is allowed to return to a relatively relaxed state. After returning to the relaxed state the dough has also resumed a new more relaxed configuration for the gluten matrix and thus a subsequent working will proceed from a relatively relaxed configuration. This will be less likely to cause damage to the gluten matrix. This compares to relatively deep dough working steps or, even more damaging continuous working, which is far more likely to stretch the gluten chains to the breaking point, and do significant damage.

Similar problems are posed in the handling of flaky unleavened crusts, as are employed in the manufacture of such products as pies and dumplings. More particularly, such flaky finished product structures depend upon localized stratifications of flattened water and flour dough strata which, under ideal circumstances, are separated and maintained as discrete elements during handling by a layer of relatively fatty material such as oil, butter, hydrogenated oil (such as margarine), or lard.

Pie doughs are typically made to incorporate such stratified structures by forming a dough of comminuted cold margarine, flour and cold water. The dough is then formed with a minimum of handling into a solid mass. Any extra handling will have the undesirable effect of working the margarine or other fatty substance into the dough and dispersing it uniformly throughout the dough. This problem is promoted both by the working of the dough and the heat that working generates and will, if not absolutely minimized, defeat the formation of discrete dough strata and the resultant tendency to form flakes after baking.

In other words, the object of the ingredient blending and dough working operation is to maintain the integrity of numerous strata which, after baking, will flake separately in the crust, thus giving the desired flaky texture to the crust. At the same time, the dough must be worked enough to give the sheet significant integrity to permit subsequent handling steps to go forward. In this respect, the working of pie crust dough from a large substantially round dough mass into a dough sheet is substantially the same as that for yeast breads insofar as once the dough is formed, the stratified fat and flour strata form an architecture which should be preserved to maintain the quality of the baked goods.

More precisely, the object of the handling operation in pie crust dough formation is to achieve the formation of a dough mass into a thin sheet and final product with a minimal amount of handling and with a correspondingly minimal, and relatively minimal and predictable disruption of the architecture of the dough.

One of the most common methods of working dough is the passing of the dough between a pair of calendar rollers whose separation is adjustable to any desired gap. In principle, this can be employed to form a relatively thick sheet from dough in a bin or hopper. Typically, such calendaring is then successively applied to the sheet of dough to successively reduce the thinness of the dough sheet. However, continuous calendaring of dough from a bin almost inevitably will impart unacceptable levels of uniaxiality and damage to the molecular gluten strands, and thus is not a commercially acceptable method of working a well developed gluten matrix.

Generally, calendar sheet formation and reduction of the thickness of a sheet of yeast dough is achieved by a combination of pulling and pressing. For example, dough which is to be reduced in thickness by factor of six is pulled away from a conveyer, at a speed which is quicker than the speed at which it is being fed into a pair of reducing rollers by the same factor (namely, six) as the desired reduction in thickness. In the case of yeast dough, the stretchability and resilience of the dough allows a substantial amount of leeway. However in the case of stratified unleavened margarine flour dough, care must be taken not to apply tension to the dough sheet in order to avoid the tendency of the dough sheet to break apart. Generally, the greater the reduction in thickness of the dough, the greater the damage to the gluten matrix.

In commercial applications, dough is made in relatively large batches on the order of 680 kilograms. Even a small system works with batches on the order of 340 kilograms. While, in principle, it is possible, as noted above, to force the kneaded dough through a continuous forming operation to form a continuous dough billet or sheet, the stresses that would be applied during such an operation would too seriously damage the gluten structure. This type of damage is particularly undesirable in the case of high moisture doughs which typically have a moisture content, by weight, equal to or greater than 50% the weight of the flour in the dough. Such 50% or greater water doughs can develop free water, if significant damage is done because of excessive shear to the gluten structure.

This reduces shelf life and will result in ice crystals in the bread if it is frozen.

One approach to the problem is the metering of chunks of dough from a hopper containing the kneaded product. This is achieved by using a pair of cooperating cutter blades, typically mounted three on a spindle, which cooperate with each other to remove chunks of dough. Such cutters are typically on the order of a meter long with cutter element diameters of about 0.5 meters. Each of the cutter elements typically comprises a spindle with three blades spaced equiangularly, 120 degrees apart, with respect to each other around the spindle. The problem with this approach, however, is that the dough tends to stick to the blades. This problem is particularly acute in the case of high water doughs, which are usually sticky.

SUMMARY OF THE INVENTION

The inventive dough sheeting system comprises a cutter assembly for pulling and cutting elongated chunks of dough from a hopper containing dough. A receiving surface is disposed beneath the cutter assembly. A motor advances the receiving surface in a direction of dough feed. A calendar assembly receives dough output by the receiving surface and outputs a sheet of dough. A level sensor for monitoring the height of accumulated dough at the input of the calendar assembly and for producing a signal when the input exceeds a predetermined level. The motor is responsive to the signal from the level sensor to stop advancing the receiving surface when the level exceeds the predetermined level and is responsive to the signal when the height is reduced. A movement sensor monitoring the advancement of the receiving surface to actuate the cutter assembly to pull and cut a chunk of dough when the surface has advanced a predetermined distance from the position at which the surface was positioned when a prior chunk of dough was delivered to the surface.

In accordance with preferred embodiment of the invention a cutter assembly pulls and cuts elongated chunks of dough from a hopper containing dough. The cutter assembly is comprised of a plurality of flat members of substantially rectangular shape. The flat members are positioned to form a tubular pipe-like member.

A pulling assembly is disposed under the cutter assembly and is responsive to the operation of the cutter assembly to pull chunks of dough from the cutter assembly. An alternative cutter assembly comprises a plurality of radially extending planar members positioned for rotation about an axis.

The invention, as claimed, is intended to provide a remedy. It solves the problem of how to provide a reliable way of dropping a chuck or strip of dough onto a conveyer, at a predetermined position with respect to advancement of the conveyer and centered on the conveyer.

BRIEF DESCRIPTION OF THE DRAWINGS

One way of carrying out the invention is described in detail below with reference to drawings which illustrate only two specific embodiments of the invention and in which.

DETAILED DESCRIPTION OF THE PREFERRED EMBODIMENTS

Figure 1:
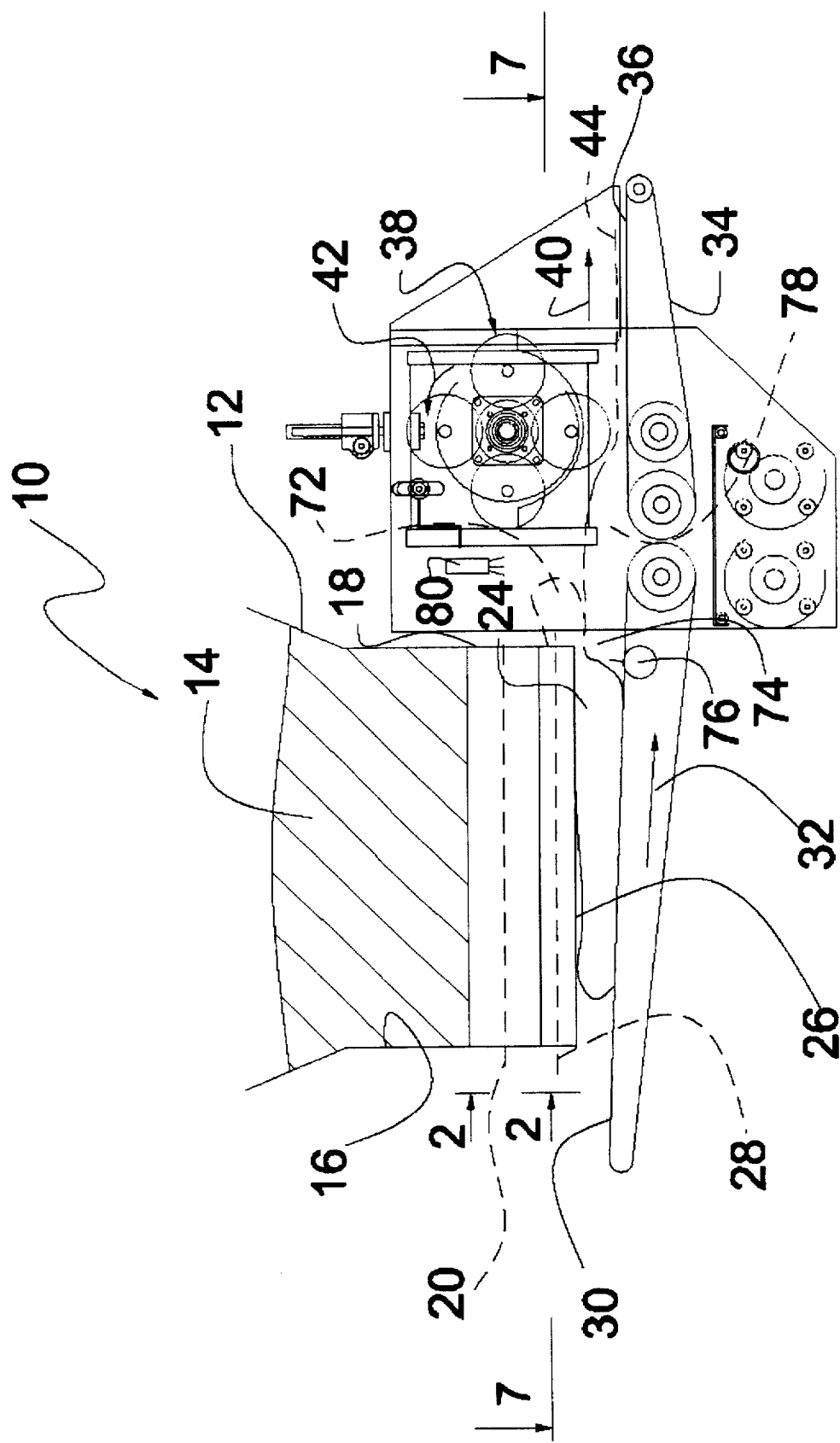
FIG. 1 is a diagrammatic representation of the inventive sheet forming system.
Figure 2:
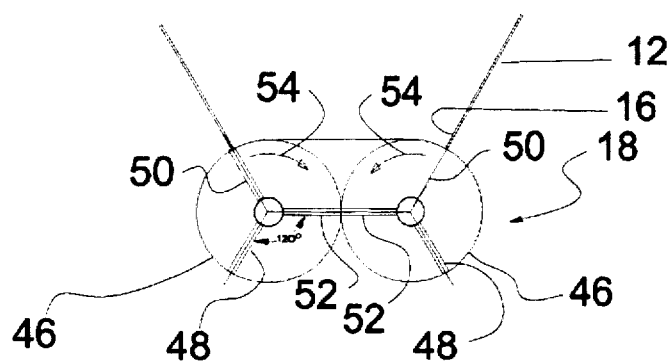
FIG. 2 is a diagrammatic cross sectional view of the cutter blade of the inventive system.
Figure 3:
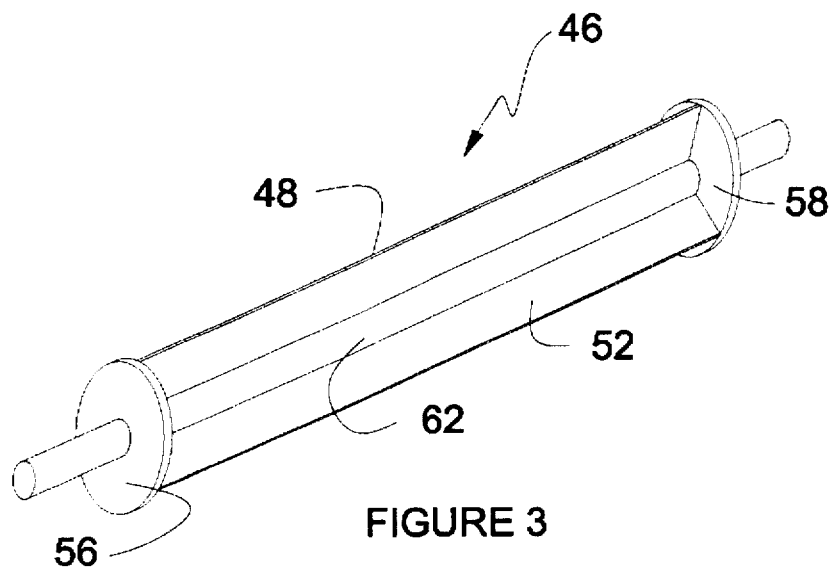
FIG. 3 is a perspective of the blades illustrated in FIG. 2.

Referring to FIGS. 1 to 3, a dough sheeting system constructed in accordance with the present invention is illustrated. More particularly, as illustrated in FIG. 1, the inventive dough sheeting system 10 comprises a bin 12 for holding a quantity of dough 14. Bin 12 is made of sheet metal, preferably stainless steel. Bin 12 defines an opening 16, through which dough 14 passes for further processing.

Opening 16 is closed by blade assembly 18, which rotates along an axis 20. Beneath blade assembly 18, a conveyer belt 22 is positioned to receive severed strips of dough 24. The removal of strips of dough 24 from blade assembly 18 is insured by a pair of pulling rollers 26 which rotate along axes 28.

The top surface 30 of conveyer 22 advances in the direction indicated by arrow 32. This results in advancing strips 24 toward a second conveyer 34 which has a top surface 36. Top surface 36 is disposed in facing spaced relationship to a calendaring satellite roller assembly 38, whose mechanics will be described in detail below. Top surface 36 is advanced in the direction indicated by arrow 40. Likewise, calendaring satellite roller assembly 38 is rotated in the direction indicated by arrow 42. This results in pulling dough strips 24 between conveyer 34 and calendaring satellite roller assembly 38. Because the gap between surface 36 and roller assembly 38 is relatively narrow, the sheet of dough 44 exiting from the inventive system 10 is of relatively thin gauge.

Referring to FIG. 2, the construction of blade assembly 18 is illustrated. It is noted that rollers 26 are not illustrated in this Figure for purposes of clarity of illustration. Blade assembly 18 comprises a pair of three-blade rotary cutters 46. Rotary cutters 46 each comprise three blades 48, 50 and 52. Each of the cutters 46 rotates in the direction shown by its respective arrow 54.

The construction of the rotary cutters 46 is illustrated in the perspective drawing of FIG. 3. Blades 48, 50 and 52 are secured between a pair of disks 56 and 58. Means for mounting a suitable rotating support, such as bearings, is provided by a pipe 62. Pipe 62 may be welded to disks 56 and 58. In similar fashion, blades 48–52 are welded to disks 56 and 58 and also welded to pipe 62.

Figure 4:
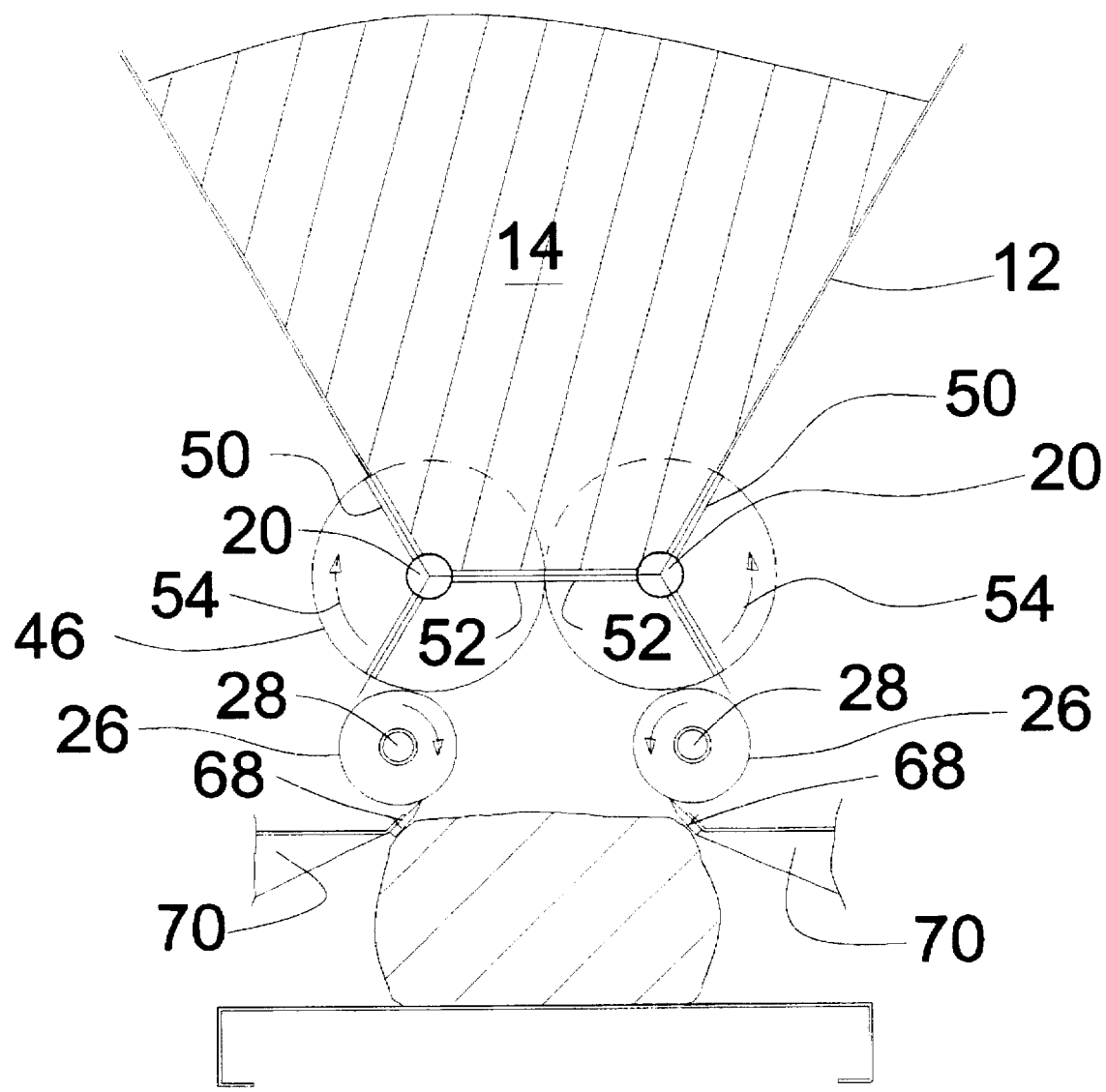
FIG. 4 is a view similar to FIG. 2, showing a first state in the operation of the inventive system.
Figure 5:
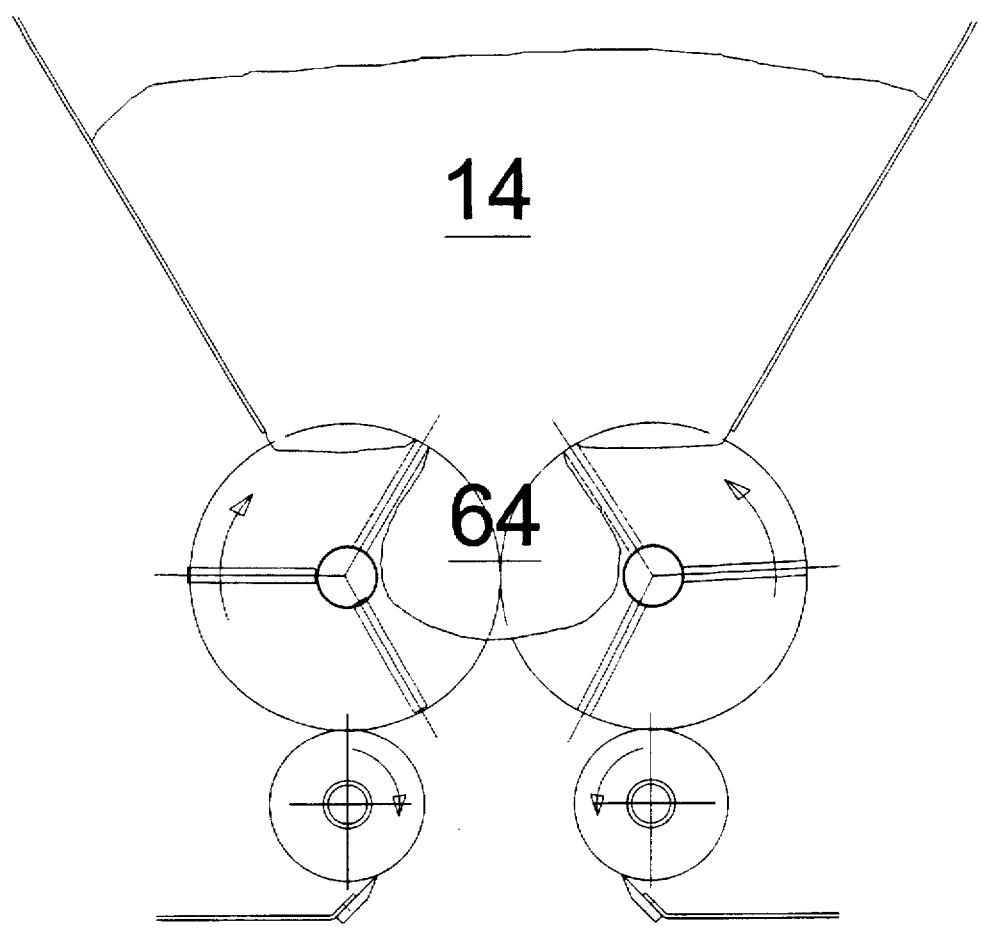
FIG. 5 is a view similar to that of FIG. 4, illustrating a second state in accordance with the present invention.
Figure 5:
Figure 6:
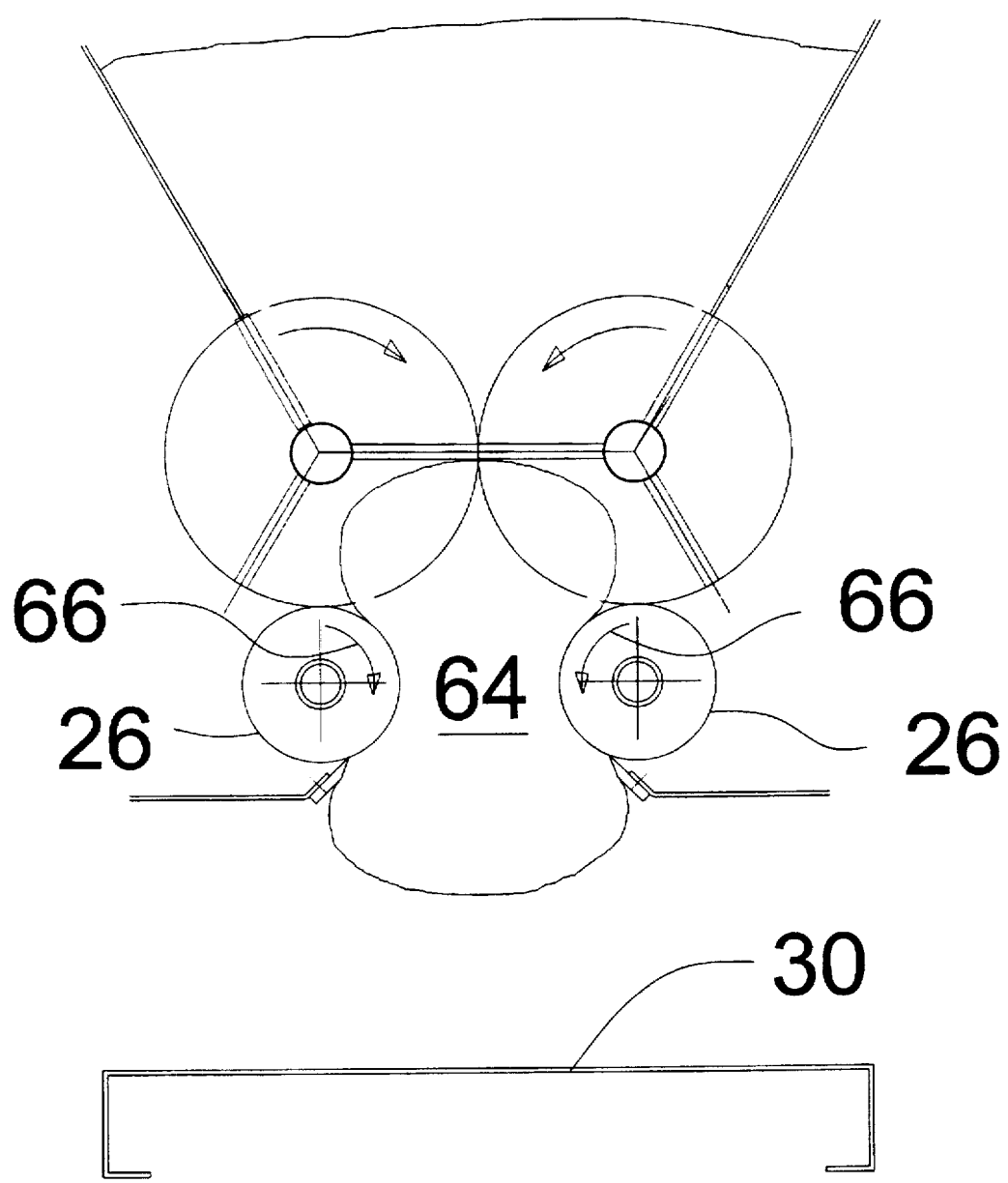
FIG. 6 is a view similar to that illustrated in FIG. 4, showing the inventive system in a second state.

The operation of the inventive system may be understood with reference to FIGS. 4, 5 and 6. More particularly, with reference to FIG. 4, consider the generation in continuous fashion of strips of dough 24 from an arbitrary position with blades 52 in abutting relationship.

As rotary cutters 46 turn in the direction of their respective arrows 54, the portion 64 of dough 14 which rests above plates 52 is engaged, cut and driven by cooperating blades 50. The result is the advancement of portion 64 of dough 14 to the position illustrated in FIG. 5. As rotation continues, portion 64 is driven forward to the position illustrated in FIG. 6. In this position, portion 64 is engaged by rollers 26. Rollers 26 rotate in the directions indicated by arrows 66. As a consequence, portion 64 is fictionally engaged by the surfaces of rollers 26 and driven outwardly toward the top surface 30 of conveyer belt 22.

As can be seen most clearly with reference to FIG. 3, blades 48, 50 and 52 are approximately 76 cm in length. Thus, each strip 24 of dough is also approximately 76 cm in length. Release of strips 24 is accommodated by coating blades 48, 50 and 52 with SILVERSTONE (™) plastic. This results in a more sure grasping of portion 64 by rollers 26. Release by rollers 26 is promoted through the use of a pair of doctor blades 68 on supports 70. Doctor blades 68 bear against the surfaces of their respective rollers as is illustrated most clearly in FIG. 4.

As noted above, blade assembly 18 is approximately 76 cm in length. Thus, strips of dough 24, when they are released from the rollers 26 onto top surface 30 have a length of approximately seventy centimeters. The speed of conveyer 22 is adjusted in such a manner that when a strip of dough 24 such as that illustrated in FIG. 7, falls on conveyer 22, its forward end 72 overlies the rearward end 74 of the strip 24 a which preceded it, More particularly, the movement of conveyer 22 is made responsive to the condition of the chunks of dough being produced and dropped onto it. This may be achieved in a simple fashion because of the known length of the strips of dough which are being produced by the blade assembly and being pulled by the rollers which underlie the blade assembly.

In accordance with the present invention, control of the movement of belt 22 is achieved through the use of a distance measuring sensor 76, which may be of the pulse generating or other known type. As can be seen most clearly in FIG. 1, strips of dough 24 are advanced by conveyer 22 and are pressed between top surface 36 and the bottom of roller assembly 38. Naturally, different doughs have different characteristics and their being worked between roller assembly 38 and conveyer 34 will result in varying the draw of dough from conveyer 22. Moreover, it is typical for the operator of the sheeting system 10 to vary the gap between roller assembly 38 and top surface 36. This adjustment will also vary the rate at which dough is drawn from the end of conveyer 22.

As dough is fed between roller assembly 38 and top surface 36, it tends to accumulate in a mass 78 on the opposite side of the calendaring satellite roller assembly 38 from sheet 44. The amount of such accumulation is measured by a level sensor 80. When the level of any accumulation 78 becomes too high, a signal is sent to the system controlling the motor which advances conveyer 22 and the movement of conveyer 22 is reduced in speed. However, the movement of conveyer 34 is continued, as is the movement of roller assembly 38. The result is that the accumulation 78 of dough at the input of the calendaring satellite roller assembly 38 is reduced until that reduced level is detected by sensor 80 which then sends a signal to the motor driving conveyer 22 telling conveyer 22 to increase speed in the direction indicated by arrow 32.

Thus the accumulation of dough is being continually monitored by the system which feeds dough from conveyer 22 only when it is needed. Likewise, when conveyer 22 has advanced a distance corresponding to a desired portion of the length of a strip of dough, blade assembly 18 and rollers 26 are rotated to cut and drop another strip of dough 24. In accordance with the invention, the overlap between successive chunks of dough can be varied in accordance with the characteristics of the dough being worked and the product be produced.

As the system 10 is illustrated in FIG. 1, chunk overlap has been set for about 20%. This is a typical choice for the manufacture of many products. As alluded to above, such an amount of overlap is achieved by activating blade assembly 18 when distance sensor 76 has detected movement of conveyer 22 corresponding to a distance equal to 80 percent of the length of chunk 24.

In principle, overlaps on the order of approximately 50 percent are practical in many product manufacturing situations. Moreover, because release of chunks of dough can be achieved without spraying the dough with oil or other artifices, merging between successive chunks of dough at the point of overlap is of good quality and therefore the sheet of dough produced by the system has good integrity.

Figure 7:
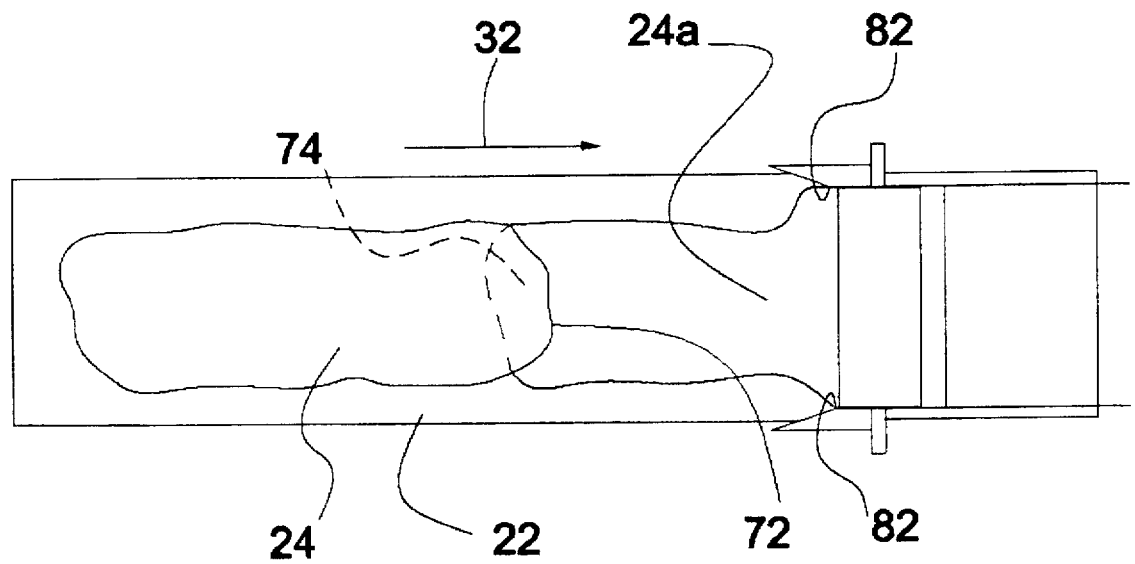
FIG. 7 is a view along lines 7—7 of FIG. 1.

Consistent with the other high quality aspects of the sheet being produced, good edging is provided by a pair of fences 82, as illustrated most clearly in FIG. 7. The use of such fences is of particular value in accordance with the present invention because of the objectives of high throughput without overly demanding operator requirements. In this regard, it is anticipated that the inventive system will be releasing chunks of dough having a weight of approximately 18 kg each with a throughput of approximately 5,500 kg per hour.

As can be seen from the above, the chuncking of the dough into discrete strips which are advanced by a separate conveyor with overlapping chunk ends, toward a second conveyor which carries the chunks into a calendar assembly, given the individual speed controls on each of the conveyors and the adjustment of the system in response to the measurement of dough height results in improvement in the degree of relaxation of gluten strands in the dough. However, in order to maximize the benefits provided by this improved apparatus, the calendar assembly must also minimize the amount of stress which it imparts to the dough.

Generally, it has been known that the use of a multi-roller assembly where the dough is successively subjected to pressure for a period of time, then allowed to relax will result in relatively stress-free dough. This is achieved because this type of structure applies pressure, stretching out the gluten strands, and then removes the pressure allowing them to assume a more relaxed state, but one which nevertheless exhibits a dough shape which is closer to the shape which one desires to work the dough into. While such multi-roller configurations are known, the combination of dough chuncking in accordance with the present invention together with multi-roller reduction of the overlapping dough chunks into a sheet of relatively small thickness results in a remarkably stress free dough sheet.

Figure 8:
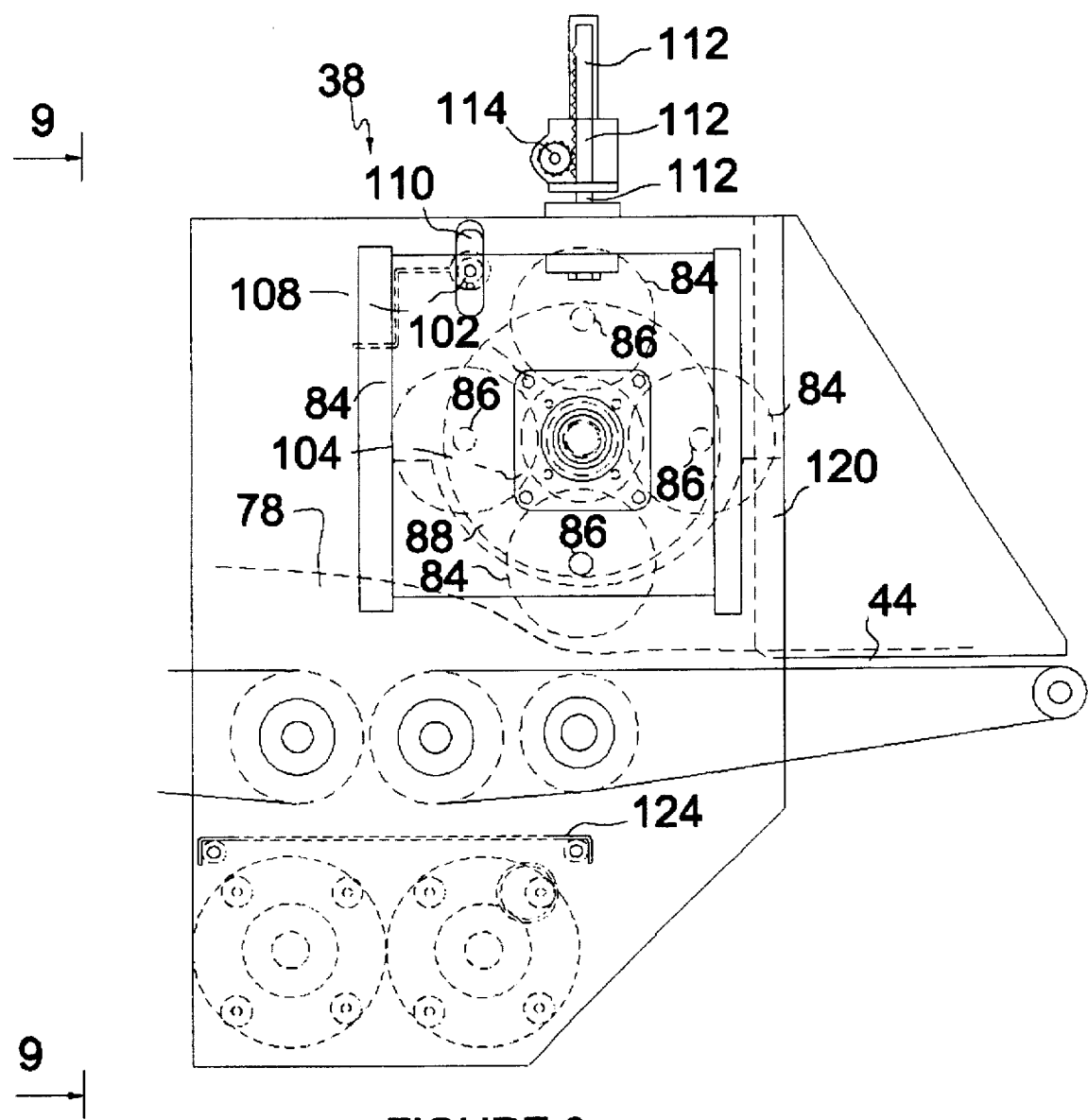
FIG. 8 is a view similar to that of FIG. 1, illustrating the details of the calendaring assembly section of the system of the present invention.
Figure 9:
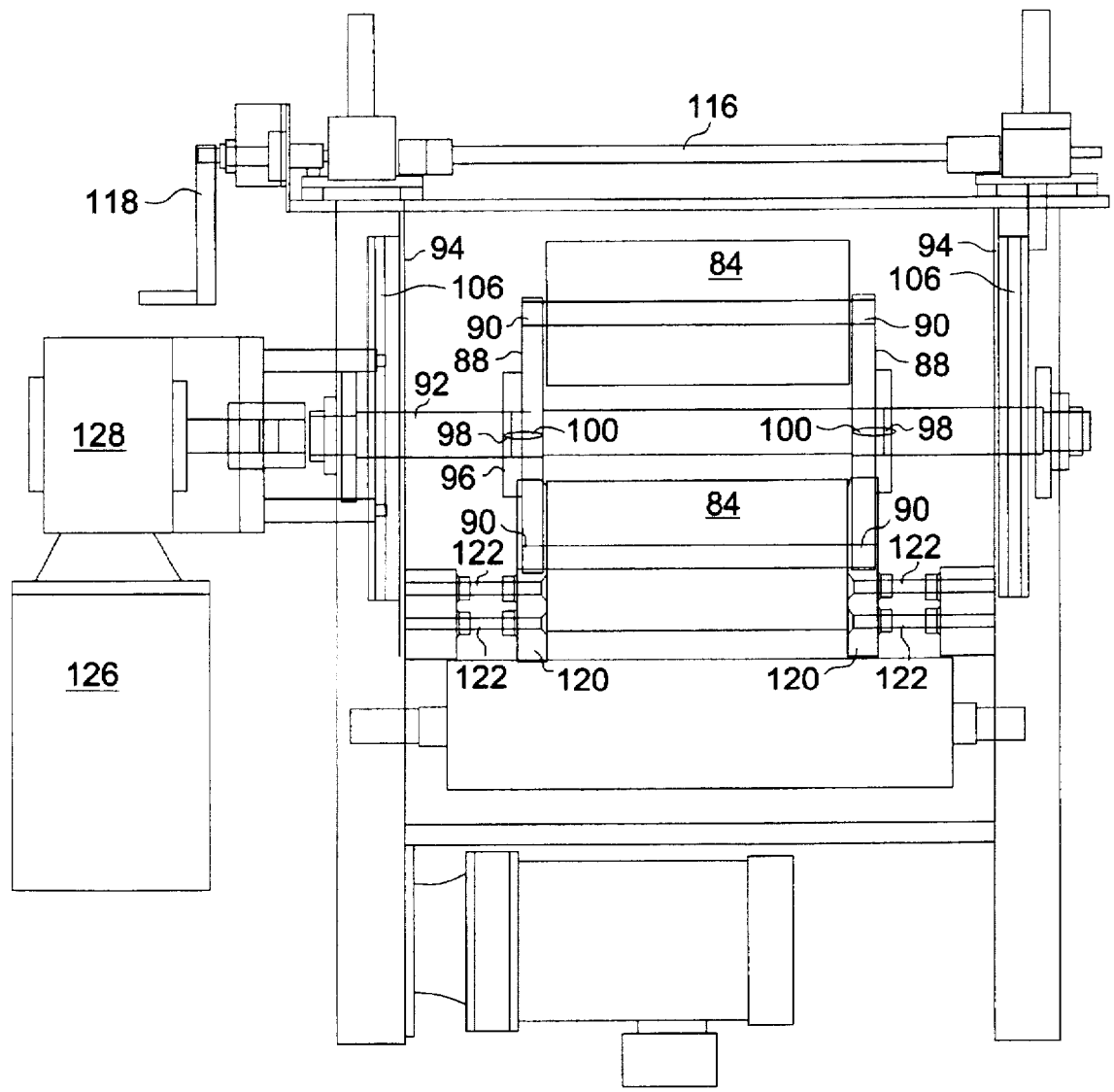
FIG. 9 is a view along lines 9—9 of FIG. 8, illustrating the details of the calendaring assembly section of the system of the present invention.

Referring to FIGS. 8 and 9, the details of construction of the calendar assembly 38 are illustrated. As can be seen most clearly in FIG. 8, assembly 38 comprises a multi-roller assembly made of four cylindrical UHMW members 84 mounted on stainless steel rods 86. In accordance with the preferred embodiment of the invention, all UHMW members are made of ultra high molecular weight polyethylene. Stainless steel rods 86 are, in turn, mounted in a pair of UHMW polyethylene side discs 88.

As can be seen most clearly in FIG. 9, discs 88 contain holes 90 within which stainless steel rods 86 are free to rotate in a free-wheeling fashion. Accordingly, as they bear down on dough mass 78, they are free to have an absolute circumferential velocity equal to that of the dough mass. Moreover, because the coefficient of friction between the stainless steel rods 86 and the inside surface of holes 90 is relatively small there is no need for the use of bearings with the problems normally incident to the use of bearings, such as bearing wear, sintering, grease, and so forth.

Discs 88 are, in turn, mounted on a central shaft 92 supported by the sides 94 of the housing of the apparatus. Discs 88 are maintained stationary with respect to shaft 92 by a pair of plates 96 which include set screws 98, which bear into slots 100. Plates 96 are secured to discs 88 by bolts 102. Shaft 92 is free to move up and down between sides 94 within a slot 104, the actual vertical position being determined by a pair of side plates 106. Movement of side plates 106 is restricted by posts 108 mounted in slots 110.

Plates 106 are held at a desired height by a pair of threaded members 112, whose threads are engaged by a pair of gears 114 which are in turn secured to an adjustment shaft 116 which is mounted for rotation and attendant adjustment of the height of the assembly 38 through the use of a crank 118 which may be rotated to adjust the position of assembly 38 with respect to a dough mass 78.

Control of the dough during the formation of a sheet 44 is maintained by a pair of side plates 120 which mate with discs 88. Discs 120 are secured to the housing by a plurality of bolts 122 as can be seen most clearly in FIG. 9.

Flexibility is provided by having satellite assemblies including their own discs 88 and associated free-wheeling rollers 84, with the rollers 84 having different dimensions. These may be kept in storage under a protective canopy 124 as illustrated in FIG. 8.

Assembly 38 is driven by a motor 126 coupled to shaft 92 by a ninety degree gear box 128.

In accordance with a preferred embodiment of the invention, cutting is performed by solid triangular cutters.

Figure 10:
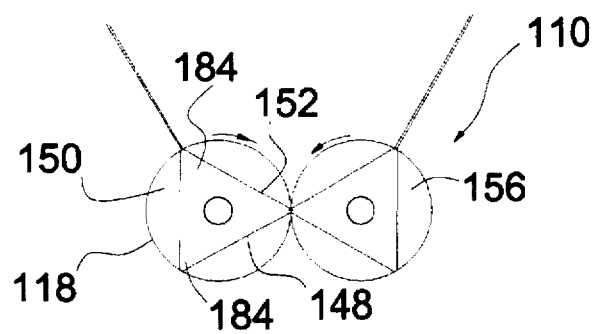
FIG. 10 is a view illustrating an alternative cutter assembly.
Figure 11:
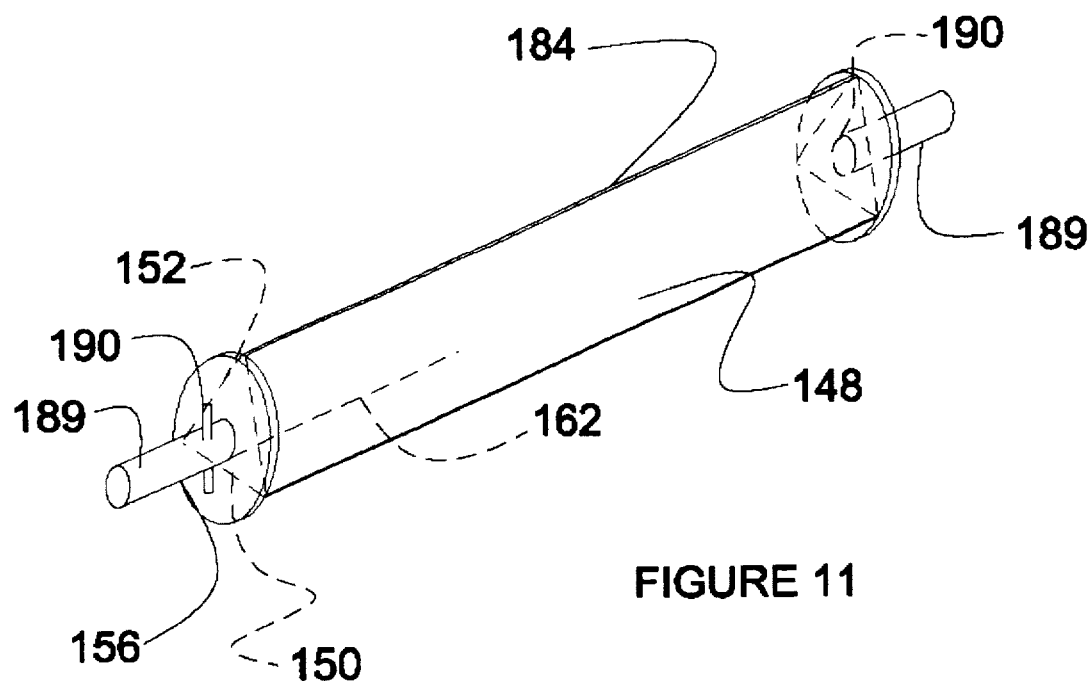
FIG. 11 is a perspective view illustrating the cutter assembly of FIG. 8.

More particularly, as illustrated in FIG. 10, an alternative cutter assembly 118 is used in an alternative system 110. Cutter assembly 118 is machined from ultra high molecular weight polyethylene (UHMW) to form a body with a triangular cross section with surfaces 148, 150 and 152, and a round disk 156 at each end, as illustrated more clearly in FIG. 11.

The construction of cutter assembly 118 is similar to that of assembly 18.

The structure is completed by a stainless steel shaft 189, press fitted through the UHMW-PE round body of assembly 118 and secured by pins 190 press fitted through the UHMW-PE body and of assembly 118 the stainless steel shaft. Pins 190 are perpendicular to the centerline of the UHMW-PE body and the stainless steel shaft.

While a illustrative embodiments of the invention have been described above, it is, of course, understood that various modifications will be apparent to those of ordinary skill in the art. Such modifications are within the spirit and scope of the invention, which is limited and defined only by the appended claims.

I claim:

1. A dough sheeting system, comprising:
   (a) a hopper containing dough;
   (b) cutter assembly supported below said hopper for pulling and cutting chunks of dough from said hopper containing dough;
   (c) a first receiving surface disposed and supported beneath said cutter assembly, said first receiving surface having an output end;
   (d) a motor for advancing said first receiving surface in a direction of dough feed;
   (e) an independently rotatable calendar assembly positioned at the output of said first receiving surface for receiving dough output by said first receiving surface and outputting a sheet of dough, said calendar assembly, comprising:
      (i) a second receiving surface positioned to receive said dough chuncks from said first receiving surface;
      (ii) a satellite head comprising a plurality of rotatable mounted rollers disposed over said second receiving surface; and
      (iii) a drive member to rotate said satellite head to reduce the thickness of said dough chunk and provide a dough sheet therefrom;
   (f) a level sensor for monitoring the height of accumulated dough at the input of said calendar assembly and for producing a signal when said input exceeds a selectable level, said motor being responsive to said signal from said level sensor to stop advancing said first receiving surface when said level exceeds said selectable level and being responsive to said signal when said height is reduced to advance said first receiving surface; and
   (g) a movement sensor monitoring the advancement of said first receiving surface to actuate said cutter assembly to pull and cut a chunk of dough when said surface has advanced a selectable distance from the position at which said first receiving surface was positioned when a prior chunk of dough was last delivered to said first receiving surface.

2. A dough sheeting system, comprising:
   (a) a cutter assembly for pulling and cutting elongated chunks of dough from a hopper containing dough, said cutter assembly being comprised of a plurality of flat members of substantially rectangular shape, said flat members being positioned to form a tubular pipe-like member;
   (b) a receiving surface disposed beneath said cutter assembly;
   (c) a motor for advancing said receiving surface in a direction of dough feed;
   (d) a second receiving surface positioned to receive dough from said first receiving surface;
   (e) a satellite head comprising a plurality of rotatably mounted rollers disposed over said receiving surfaces; and
   (f) a drive member to rotate said satellite head to reduce the thickness of said dough chunk and provide a dough sheet therefrom.

3. A dough sheeting system as in claim 2, wherein there are three pipe like members.

4. A dough sheeting system as in claim 2, wherein said flat members are made of plastic.

5. A dough sheeting system as in claim 2, wherein said flat members are arranged to form a pipe-like member of triangular cross-section.

6. A dough sheeting system, comprising:
   (a) a cutter assembly for pulling and cutting elongated chunks of dough from a hopper containing dough;
   (b) a receiving surface disposed beneath said cutter assembly;
   (c) a motor for advancing said receiving surface in a direction of dough feed;
   (d) an independently rotatable calendar assembly for receiving dough output by said receiving surface and outputting a sheet of dough, said calendar assembly comprising:
      (i) a satellite head comprising a plurality of rotatable mounted rollers disposed over said receiving surfaces; and
      (ii) a drive member to rotate said satellite head to reduce the thickness of said dough chunk and provide a dough sheet therefrom;
   (e) a pulling assembly disposed under said cutter assembly responsive to the operation of said cutter assembly to pull chunks of dough from said cutter assembly; and
   (g) a second receiving surface positioned to receive dough from said first receiving surface.

7. The dough sheeting assembly as in claim 6, further comprising:
   (f) a level sensor for monitoring the height of accumulated dough at the input of said calendar assembly and for producing a signal when said input exceeds a selectable level, said motor being responsive to said signal from said level sensor to stop advancing said receiving surface when said level exceeds said selectable level and being responsive to said signal when said height is reduced; and
   (g) a movement sensor monitoring the advancement of said receiving surface to actuate said cutter assembly to pull and cut a chunk of dough when said surface has advanced a sufficient distance from the position at which said surface was positioned when a prior chunk of dough was delivered to said surface, said distance being selectable.

8. A dough sheeting system as in claim 1, wherein said cutter assembly comprises a plurality of radially extending planar members positioned for rotation about an axis.

9. A dough manipulating assembly, comprising a pair of plastic discs in facing spaced relationship to each other, said plastic disks defining a plurality of holes, the holes in one disk being in facing spaced relationship to the holes in the other disk to form pairs of facing holes, and a plurality of cylindrical roller members each disposed in one of said pairs of facing holes in said discs, said disks being mounted for rotation over a work surface adapted to receive dough to be worked by said roller members upon rotation of said disks.

10. A dough manipulating assembly as in claim 9, wherein said plastic discs are polyethylene.

11. A dough manipulating assembly as in claim 9, wherein said polyethylene is ultra high molecular weight polyethylene.

12. A dough manipulating assembly as in claim 9, wherein said cylindrical roller members comprise a stainless steel spindle engaged by the holes in said discs.

13. A dough manipulating assembly as in claim 1, wherein said satellite head comprises a pair of plastic discs in facing spaced relationship to each other, said plastic disks defining a plurality of holes, the holes in one disk being in facing spaced relationship to the holes in the other disk to form pairs of facing holes, and a plurality of cylindrical roller members each disposed in one of said pairs of facing holes in said discs, said disks being mounted for rotation over a work surface adapted to receive dough to be worked by said roller members upon rotation of said disks.

14. A dough sheeting system, comprising:

(a) a hopper containing dough;

(b) a cutter assembly supported below said hopper for pulling and cutting chunks of dough from said hopper containing dough;

(c) a first receiving surface disposed and supported beneath said cutter assembly, said first receiving surface having an output end;

(d) a control system;

(e) a motor responsive to said control system for advancing said first receiving surface in a direction of dough feed at a rate which results in overlap between successive dough chunks output by said cutter assembly to produce an overlapping dough chunk output;

(f) an independently rotatable satellite head calendar assembly comprising a bottom calendering structure and a top calendering structure, said top and bottom structures being positioned to receive overlapping dough chunks output by a said chunker from said first receiving surface and outputting a sheet of dough.

15. A dough sheeting system, as in claim 14, further comprising:

(g) a level sensor for monitoring the height of accumulated dough at the input of sad calendar assembly and for producing a signal when said input exceeds a selectable level, said motor being responsive to said signal from said level sensor to stop advancing said first receiving surface when said level exceeds said selectable level and being responsive to said signal when said height is reduced to advance said first receiving surface.

16. A dough sheeting system, as in claim 14, further comprising:

(g) a movement sensor monitoring the advancement of said first receiving surface to actuate said cutter assembly to pull and cut a chunk of dough when said surface has advanced a selectable distance from the position at which said first receiving surface was positioned when a prior chunk of dough was last delivered to said first receiving surface.

17. A dough sheeting system, as in claim 16, further comprising:

(b) a level sensor for monitoring the height of accumulated dough at the input of said calendar assembly and for producing a signal when said input exceeds a selectable level, said motor being responsive to said signal from said level sensor to stop advancing said first receiving surface when said level exceeds said selectable level and being responsive to said signal when said height is reduced to advance said first receiving surface.

18. A dough sheeting system, as in claim 16, further comprising:

(i) a second receiving surface positioned to receive said dough chunks from said first receiving surface;

(ii) a satellite head comprising a plurality of rotatably mounted rollers disposed over said second receiving surface; and (iii) a drive member to rotate said satellite head to reduce the thickness of said dough chunk and provide a dough sheet therefrom.

19. A dough sheeting system, as in claim 17, further comprising:

(i) a second receiving surface positioned to receive said dough chunks from said first receiving surface;

(ii) a satellite head comprising a plurality of rotatably mounted rollers disposed over said second receiving surface; and (iii) a drive member to rotate said satellite head to reduce the thickness of said dough chunk and provide a dough sheet therefrom.

20. A dough manipulating assembly as in claim 2, wherein said satellite head comprises a pair of plastic discs in facing spaced relationship to each other, said plastic disks defining a plurality of holes, the holes in one disk being in facing spaced relationship to the holes in the other disk to form pairs of facing holes, and a plurality of cylindrical roller members each disposed in one of said pairs of facing holes in said discs, said disks being mounted for rotation over a work surface adapted to receive dough to be worked by said roller members upon rotation of said disks.

21. A dough manipulating assembly as in claim 6, wherein said satellite head comprises a pair of plastic discs in facing spaced relationship to each other, said plastic disks defining a plurality of holes, the holes in one disk being in facing spaced relationship to the holes in the other disk to form pairs of facing holes, and a plurality of cylindrical roller members each disposed in one of said pairs of facing holes in said discs, said disks being mounted for rotation over a work surface adapted to receive dough to be worked by said roller members upon rotation of said disks.

22. A dough sheeting system as in claim 2, further comprising means to independently advance said first and second receiving surfaces.

* * * * *